US009764426B2

(12) United States Patent
Honegger et al.

(10) Patent No.: US 9,764,426 B2
(45) Date of Patent: Sep. 19, 2017

(54) MULTI-STATION LASER MACHINE

(71) Applicant: Microlution Inc., Chicago, IL (US)

(72) Inventors: Andrew Honegger, Chicago, IL (US);
Andrew Phillip, Forest Park, IL (US);
Onik Bhattacharyya, Joliet, IL (US);
Grzegorz Nowobilski, Chicago, IL (US); Brendon DiVincenzo, Chicago, IL (US); Alexander Kim, Chicago, IL (US); Michael Howard, Chicago, IL (US); Jeremy VonHatten, Chicago, IL (US); Daniel Roti, Libertyville, IL (US)

(73) Assignee: Microlution Inc., Chicago, IL (US)

( * ) Notice: Subject to any disclaimer, the term of this patent is extended or adjusted under 35 U.S.C. 154(b) by 245 days.

(21) Appl. No.: 14/559,709

(22) Filed: Dec. 3, 2014

(65) Prior Publication Data

US 2015/0151384 A1 Jun. 4, 2015

Related U.S. Application Data

(60) Provisional application No. 61/911,670, filed on Dec. 4, 2013.

(51) Int. Cl.
*B23K 26/382* (2014.01)
*B23K 26/388* (2014.01)
(Continued)

(52) U.S. Cl.
CPC ........ *B23K 26/388* (2013.01); *B23K 26/0093* (2013.01); *B23K 26/0604* (2013.01);
(Continued)

(58) Field of Classification Search
CPC ............ B23K 26/0093; B23K 26/0604; B23K 26/382; B23K 26/384; B23K 26/388; B23K 26/389; B23P 23/04; Y10T 408/05
See application file for complete search history.

(56) References Cited

U.S. PATENT DOCUMENTS 4,315,688 A * 2/1982 Pryor ..................... G01B 11/22
356/237.1
4,753,555 A * 6/1988 Thompson ............. B23B 47/28
33/542
(Continued)

FOREIGN PATENT DOCUMENTS

DE 10144008 A1 3/2003
JP S5744204 A 3/1982
(Continued)

OTHER PUBLICATIONS

Search Report and Written Opinion for PCT/US2014/068327 mailed Aug. 6, 2015.

*Primary Examiner* — Geoffrey S Evans
(74) *Attorney, Agent, or Firm* — McDonnell Boehnen Hulbert and Berghoff LLP

(57) ABSTRACT

The present disclosure is directed toward a machine tool configured to perform small-scale, high-accuracy drilling operations for small-hole applications. The small-hole applications for which the machine tool is designed includes holes with one or more diameters. A part may have a larger-diameter hole that penetrates through a fraction of the thickness of a part and a smaller-diameter hole that penetrates from the bottom of the larger-diameter hole through the remainder of the part thickness. Additionally, the machine tool may be used with parts in any of the following categories: (i) both the step-hole and the flow-hole are created using the machine tool; or, (ii) the step-hole is created with an up-stream process and the machine tool may accept the part, measure the step-holes and create the flow-holes; or, (iii) no step-hole is used and the machine tool may accept the part, measure the raw surface and create the flow-holes.

20 Claims, 7 Drawing Sheets

(51) Int. Cl.
  *B23K 26/00* (2014.01)
  *B23K 26/06* (2014.01)
  *B23P 23/04* (2006.01)
  *B23K 26/384* (2014.01)

(52) U.S. Cl.
  CPC .......... *B23K 26/382* (2015.10); *B23K 26/384* (2015.10); *B23K 26/389* (2015.10); *B23P 23/04* (2013.01); *Y10T 408/05* (2015.01)

(56) References Cited

U.S. PATENT DOCUMENTS

| | | | | |
|---|---|---|---|---|
| 5,010,232 A | * | 4/1991 | Arai | B23K 26/0093 219/121.67 |
| 5,216,808 A | | 6/1993 | Martus et al. | |
| 5,395,198 A | * | 3/1995 | Duffy | H01L 21/67126 118/500 |
| 6,697,154 B2 | * | 2/2004 | Owen | G01N 21/95692 348/126 |
| 6,708,385 B1 | * | 3/2004 | Lemelson | B23Q 7/03 29/563 |
| 7,379,185 B2 | * | 5/2008 | Borden | G01N 21/171 257/E21.525 |
| 2002/0017511 A1 | | 2/2002 | Kling | |
| 2002/0147521 A1 | * | 10/2002 | Mok | G05B 19/4099 700/159 |
| 2005/0263506 A1 | | 12/2005 | Masuda et al. | |
| 2006/0091842 A1 | * | 5/2006 | Nishiyama | G05B 19/4183 318/568.11 |
| 2007/0084837 A1 | * | 4/2007 | Kosmowski | B23K 26/04 219/121.68 |
| 2007/0119036 A1 | * | 5/2007 | Parmenter | B23P 15/007 29/33 P |
| 2007/0240547 A1 | * | 10/2007 | Dick | B27M 1/08 83/76.1 |
| 2008/0075565 A1 | * | 3/2008 | Grob | B23Q 7/04 414/222.13 |
| 2008/0119041 A1 | * | 5/2008 | Magera | H05K 1/115 438/637 |
| 2008/0121420 A1 | * | 5/2008 | Magera | H05K 1/115 174/262 |
| 2008/0257593 A1 | * | 10/2008 | Park | H05K 3/4679 174/258 |
| 2009/0026169 A1 | * | 1/2009 | Cho | H05K 3/0008 216/18 |
| 2009/0032506 A1 | | 2/2009 | Murtry et al. | |
| 2010/0284027 A1 | * | 11/2010 | Scheiner | G01B 11/22 356/626 |
| 2011/0017715 A1 | * | 1/2011 | Marcus | B23K 26/032 219/121.71 |
| 2014/0004361 A1 | * | 1/2014 | Sharma | B32B 27/02 428/448 |
| 2014/0353033 A1 | * | 12/2014 | Pink | E21B 44/00 175/27 |

FOREIGN PATENT DOCUMENTS

| | | |
|---|---|---|
| JP | H058066 A | 1/1993 |
| JP | H09122941 A | 5/1997 |

* cited by examiner

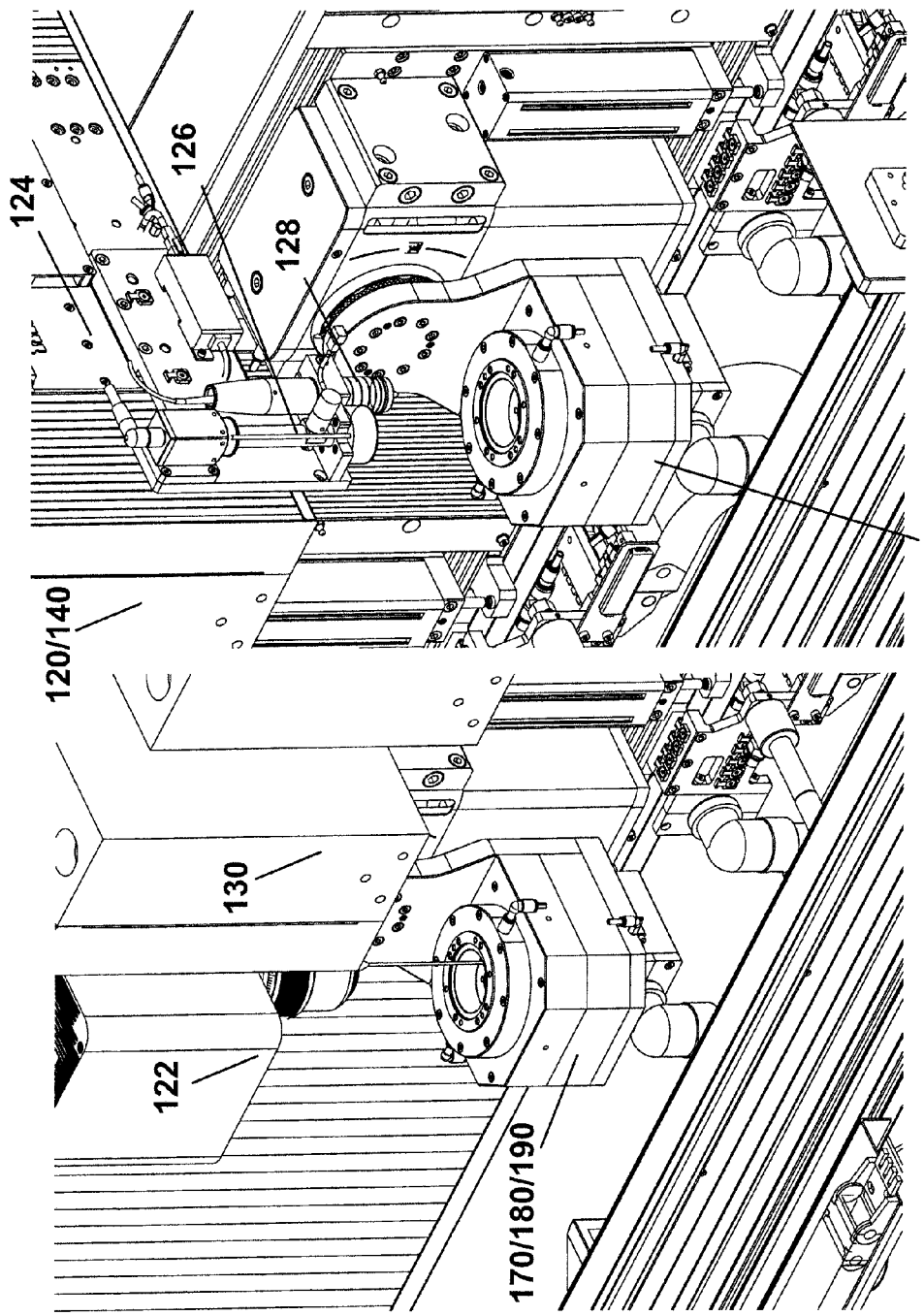

MULTI-STATION LASER MACHINE

CROSS-REFERENCE TO RELATED APPLICATIONS

This application makes reference to and claims priority to U.S. Provisional Application Ser. No. 61/911,670, filed on Dec. 4, 2013, entitled "Dual-Station Laser Machine," which is incorporated herein by reference in its entirety.

BACKGROUND

Unless otherwise indicated herein, the materials described in this section are not prior art to the claims in this application and are not admitted to be prior art by inclusion in this section.

During manufacturing of various items, machinery may be used to either automate or assist in a portion of the process. For example, some machinery may be computer controlled in order to perform precise measurements or operations. Additionally, machinery may be used to repeatedly perform a task in a consistent manner.

Successful production of fuel injector nozzles may include the creation of holes according to strict process characteristics. For acceptable performance of fuel injectors, the nozzle flow variation from one piece-part to the next should be tightly controlled. Various parameters of the nozzle are typically controlled with fairly tight tolerances. The process may control hole diameter, position, and geometric accuracy (e.g. cylindricity) of the hole creation. Additionally, the process may have a tolerance for the concentricity between different-diameter portions of the nozzle-holes (the step-hole and the flow-hole). The process may also have tight control of both the length of the smaller-diameter portion of the nozzle-hole (the flow-hole) and of surface finish and edge quality. Additionally, it may desirable for the system operating economics to be tightly controlled. From a system economics point of view, it may be desirable for the system to have low cycle time with high efficiency and utilization. It may also be desirable for the system to have low change-over times to switch from one piece-part model to the next. Additionally, it may be desirable for the disclosed system to have high flexibility to accommodate piece-part design changes as well as up-stream and down-stream process changes.

Traditional, existing production equipment designs can achieve some but not all of the characteristics listed above. For example, some designs achieve good nozzle flow variation at the expense of production economics. Other designs achieve low cycle time and high efficiency at the expense of change-over time and flexibility.

SUMMARY

Disclosed herein are embodiments of a machine tool. Generally, the machine tool is configured to perform small-scale, high accuracy drilling operations. The disclosure includes a novel machine tool system for creating small holes. The disclosed system may be used for performing hole drilling for fuel injector nozzles, although it can be applied to other small-hole applications. The characteristics of small hole applications for which the system is designed includes holes that may have two or more diameters. For example, a part may have a larger-diameter hole that penetrates through a fraction of the thickness of the part and a smaller-diameter hole that penetrates from the bottom of the larger-diameter hole through the remainder of the part thickness. In the case of fuel injector nozzles, the larger hole is referred to as the "step-hole" and the smaller hole is the "flow-hole". Additionally, the present disclosure may be used with parts that fall into any of the following categories: (i) both the step-hole and the flow-hole need to be created using the disclosed apparatus; or, (ii) the step-hole is created with an up-stream process and the disclosed apparatus may accept the part, measure the step-holes and create the flow-holes; or, (iii) no step hole is used and the disclosed apparatus may accept the part, measure the raw part surface and create the flow-holes.

The disclosed apparatus is a single, integrated machine that performs the multiple steps in creating small holes. The disclosed apparatus provides high-productivity, high-accuracy capability for creating small holes. The system combines the following features. First, the disclosed apparatus includes multiple processing stations. The multiple processing stations may include material (piece part) in-flow and out-flow; one or more sensor (step-hole or raw part measurement) stations; one or more cutting (step-hole creating) stations; and one or more laser drilling (flow-hole creating) stations. The disclosed apparatus also includes one or more part holding and positioning systems that can interact with a combination of the one or more sensor (step-hole or raw part measurement) stations or cutting (step-hole creating) stations and one or more laser drilling (flow-hole creating) stations. Further, the disclosed apparatus may include one or more robotic part transfer systems that can interact with the material (piece part) in-flow and out-flow and the one or more part holding and positioning systems. Additionally, the disclosed apparatus may include necessary electrical and control hardware.

A system is also disclosed having a first station having at least one of (i) a measuring unit configured to measure a raw part surface or a hole depth and (ii) a drilling unit configured to drill a hole having a first width. The system also includes a second station configured with a second drilling unit. The system also includes a computer system configured to operate the first station and the second station. Controlling the first station includes causing the first station to perform at least one of (i) measuring the raw part or the hole depth and (ii) drilling the hole. Controlling the second station includes causing the second station to create the through hole. The through hole has a second width and the second width is less than the first width.

A method for drilling is also disclosed. The method includes measuring a depth of a pre-existing feature via a depth-measurement and drilling a through-hole via a laser drilling tool into the raw surface or within the width of the step-hole.

An article of manufacture is also disclosed. The article of manufacture includes a non-transitory computer-readable medium, having stored thereon program instructions that, if executed by a computing device, cause the computing device to perform operations. The operations include measuring a depth of a pre-existing feature via a depth-measurement, and/or drilling a step-hole via a drilling tool, drilling a through-hole via a laser drilling tool into the raw surface or within the width of the step-hole.

Another method for drilling is also disclosed. The method includes drilling a step-hole via a drilling tool and drilling a through-hole via a laser drilling tool within the width of the step-hole.

BRIEF DESCRIPTION OF THE DRAWINGS

FIG. 2A is an example apparatus based on the present disclosure.

FIG. 2B is an example apparatus based on the present disclosure.

DETAILED DESCRIPTION

Disclosed herein are embodiments of a machine tool configured to perform small-scale, high accuracy drilling operations. As previously discussed, the disclosed system may be used for performing hole drilling for fuel injector nozzles, although it can be applied to other small-hole applications. Some specific small-hole applications for which the system is designed include holes with at least two diameters. In some embodiments, the larger hole may be referred to as the "step-hole" and the smaller hole may be referred to as the "flow-hole".

Figure 1A:
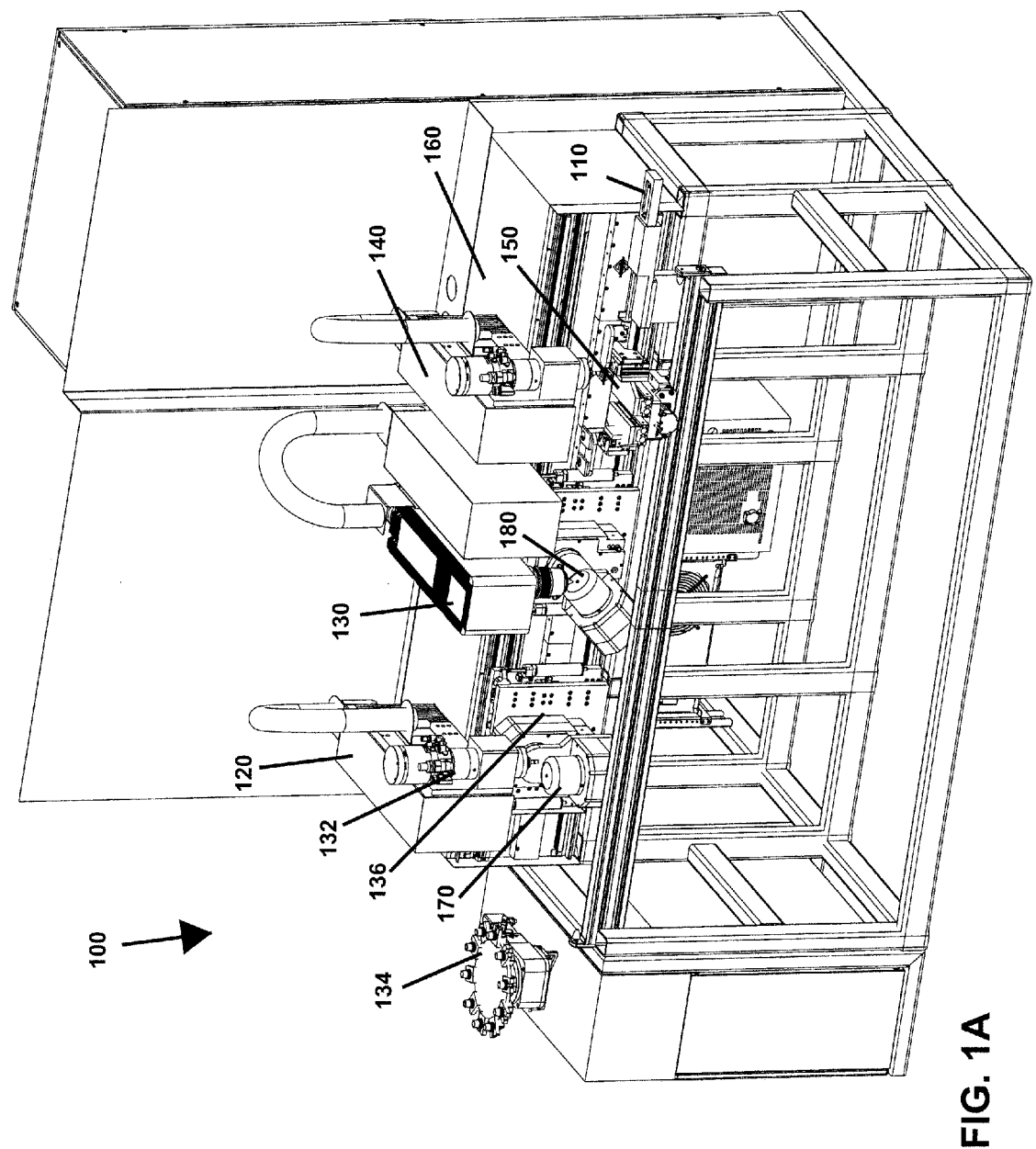
FIG. 1A is an example apparatus based on the present disclosure.

FIG. 1A is an example apparatus 100 based on the present disclosure. The disclosed Multi-Station Laser Machine is a complete production system combining a plurality of features. In some embodiments, the system features an in-flow and out-flow system 110. The in-flow and out-flow system 110 may include one or more processing station(s) where raw materials (un-processed piece-parts) enter and leave the system and a robotic system 150 for loading the material into and out of a part holding and positioning system(s). The raw materials may include some piece-parts that have already been processed by other various machines. The term raw means the piece has yet to be processed by an apparatus and/or method of the present disclosure.

In various embodiments, the system 100 may also include a first station 120 that is a raw part or step-hole measurement station and/or a step-hole creating station. In the case where station 120 is a raw part or step-hole measurement station, the system may include at least one motion stage 136 providing sensor positioning and one or more sensors (not shown in FIG. 1A) to measure the raw part or step-hole depth and/or position. The step-hole may be measured in a variety of ways. In some embodiments, optics may be used to measure the raw part or step-hole. In other embodiments, a physical measurement device may measure the raw part or step-holes. In yet further embodiments, other raw part or step-hole measurement devices may be used. The specific way in which raw parts or step-holes are measured may vary depending on the specific embodiment. Any type of measurement system, including those not specifically discussed herein, may be used within the scope of the present disclosure.

In the case where station 120 is a of step-hole creating station(s), the system may include at least one motion stage 136 providing spindle positioning, one or more spindles (such as spindle 132) or other devices to create step-holes, and additional sensor(s) to measure step-holes. The step-holes may be created through a physical drilling of the piece-part. A rotary-based drilling tool may perform the physical drilling. In other embodiments, a laser or other means for hole creation may create the step-hole.

The system 100 may also include at least one flow-hole creating station 130. The flow-hole creating station 130 may include at least one motion stage 136 providing laser positioning, one or more lasers 122 to create flow-holes, and additional sensors (not shown) to measure flow-holes. The laser drilling a hole through the piece-part may create the flow-holes. Although the term drilling is used with respect to the laser, the actual phenomenon that creates the flow-hole is a combination of melting, vaporization, and/or cold ablation caused by the laser hitting the piece-part. In other embodiments, different means, such as a rotary drill, may be used to create the flow-holes.

Additionally, the system 100 may include at least one assembly 170 configured for part holding and positioning. In some embodiments, the system may include two or more assemblies 170 (second assembly shown as 180) configured for part holding and positioning. Each part holding and positioning assembly 170 may include at least one motion stage 136 providing part positioning, and a provision for part holding. The part holding and positioning assemblies may also include the ability to interface (i.e. position relative to and execute coordinated processes with) with the robotic system for loading the material into and out of the part holding and positioning system(s) and at least one flow-hole creating station and at least one of the multiple systems listed as one or more measurement or step-hole creating station(s). In some embodiments, the system may include a design with two or more part holding and positioning assemblies (second assembly shown as 180) that are co-linear and have overlapping travel.

Additionally, the system 100 may include a second hole measurement station 140. The second hole measurement station 140 may be configured to measure both the step hole and the through hole or other features. The second hole measurement station 140 may be configured to perform verification measurements to ensure a piece part has the required sizes and tolerances. The second station 140 may also be configured to work in parallel with the systems 120 and 130.

The system may also include a prismatic, monolithic base 160 with at least two orthogonal surfaces to mount one or more measurement or step-hole creating station(s) and/or one flow-hole creating station orthogonal to the part holding and positioning assemblies. In the case of a step-hole creating system, the disclosed system may include a tool changing system 134 that allows cutting tools to be automatically replaced in the spindle(s). The system may also include a debris (waste material) management system (not shown). Additionally, the system may include enclosures/covers. Further, the system may include necessary electrical and control hardware.

Figure 1B:
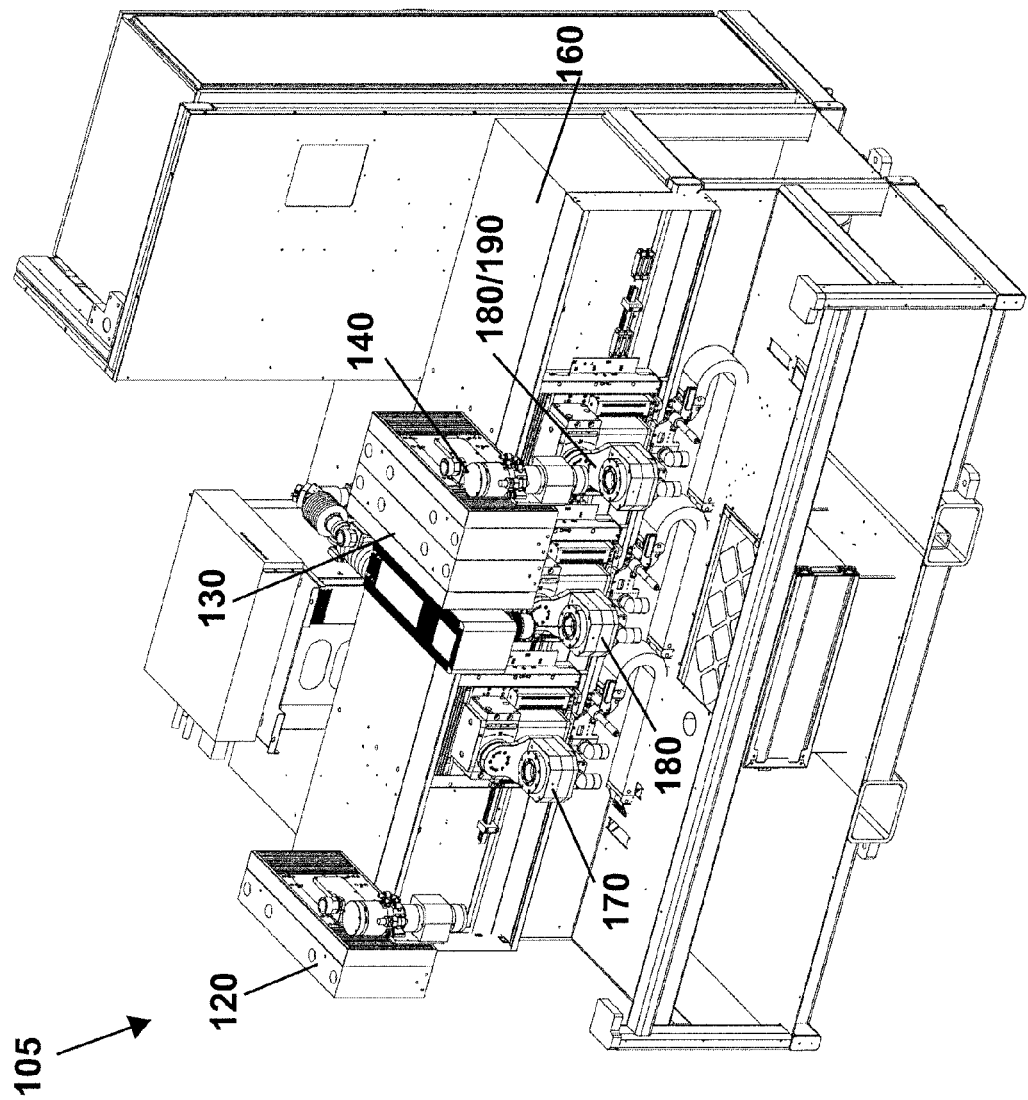
FIG. 1B is an example apparatus based on the present disclosure.
Figure 1C:
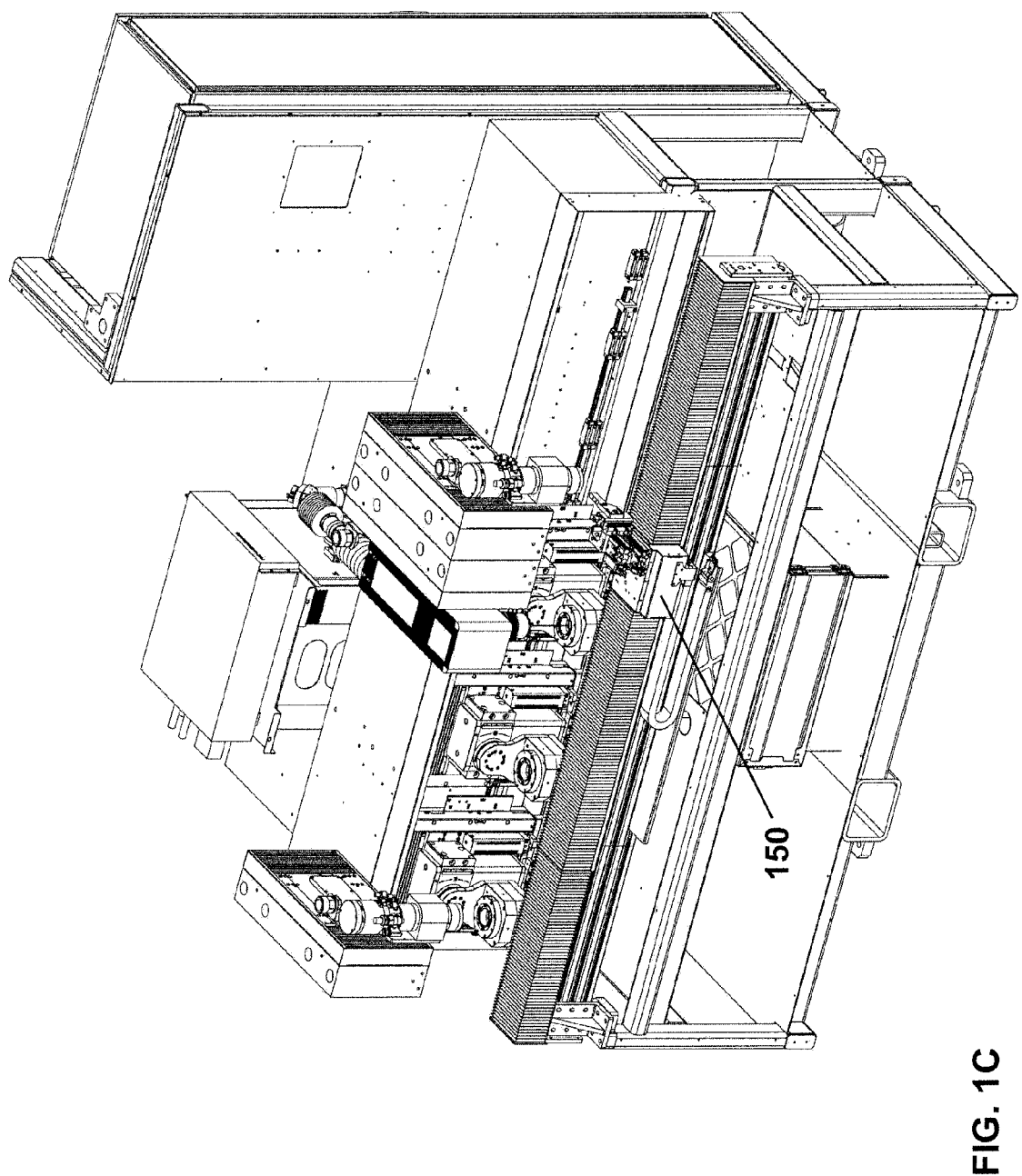
FIG. 1C is an example apparatus based on the present disclosure.

FIGS. 1B and 1C are an example apparatus based on the present disclosure. FIGS. 1B and 2B show different views and arrangements of components similar to those described with respect to FIG. 1A. Similarly, FIGS. 2A and 2B are example apparatuses based on the present disclosure. FIG. 2A shows a closer view of the part holding and positioning system 190 (or part holding and positioning system 170 or 180) located beneath the processing station 130. FIG. 2A also shows a laser drilling head 122. FIG. 2B shows a closer view of the part holding and positioning system 170/180/190 located beneath a processing station 120 or 140. In the case of FIG. 2B, the processing station contains two measurement devices, 128 a confocal measurement sensor and 126 an optical camera measurement sensor. FIG. 2B also shows a motion stage 124.

Figure 3:
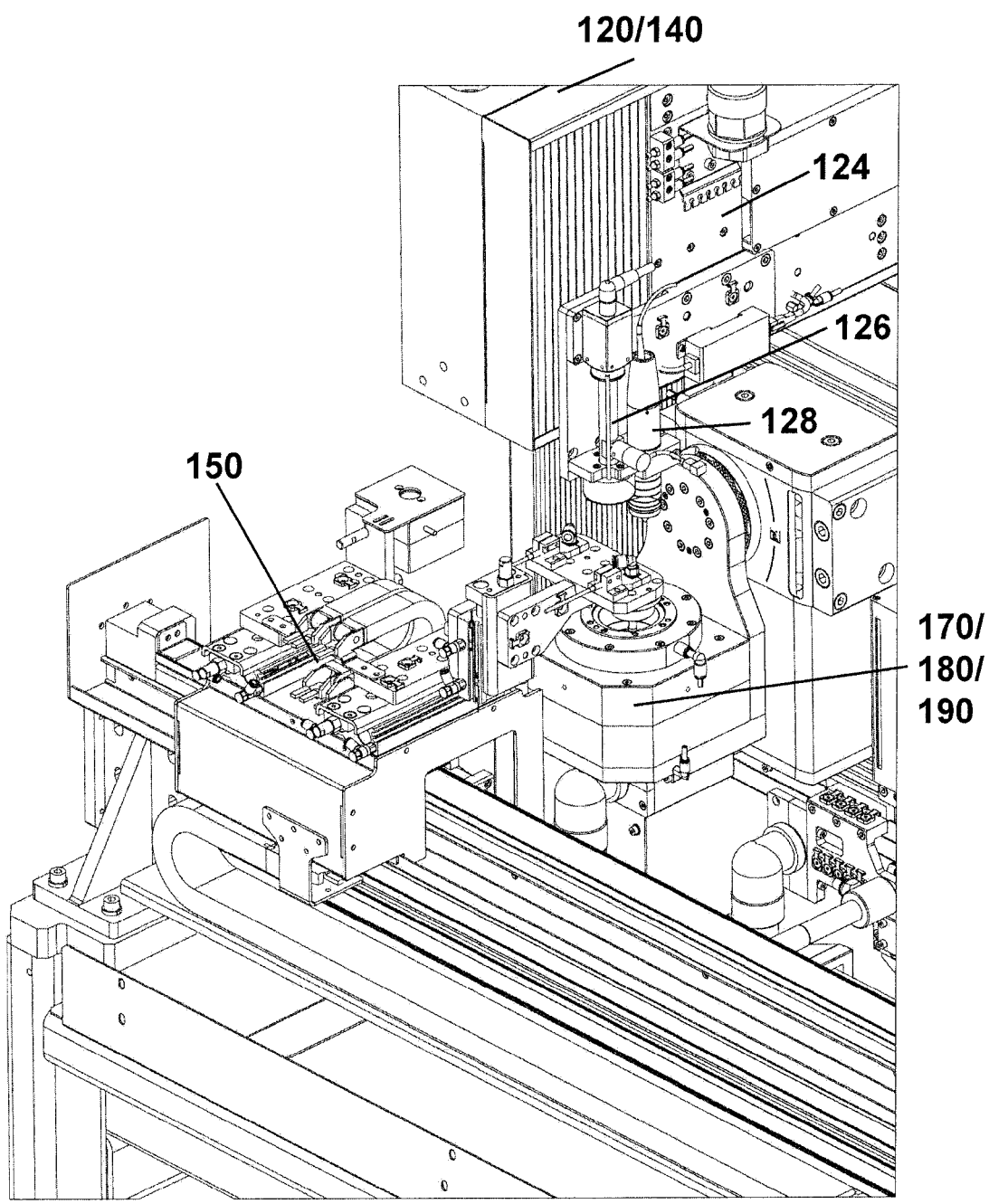
FIG. 3 is an example part-picking unit for use with the disclosed apparatuses.

FIG. 3 is an example part-picking unit for use with the disclosed apparatuses. As displayed in FIG. 3, the part-picking unit 150 is positioned over a part holding and positioning system 170/180/190, as in the case when a raw part is being transferred from 150 to 170/180/190. The part-picking unit may be used with the disclosed apparatuses to move various piece-parts throughout the disclosed system.

One example method of operating for processing an individual piece-part is as follows. It should be noted that this is only one example of a method that can be used within the context of the present disclosure. First, a piece-part is loaded into the in-flow/out-flow system. A robot, such as a robotic arm, then may take the material and transport it to one of the part holding and positioning systems, such as part holding and positioning system 170. In other embodiments, a piece-part may be directly loaded to a positioning system. Once the material is loaded into the part holding and positioning system, either directly or through the use of robotics, the part holding and positioning system (now containing the piece-part) is moved to a first station, such as station 120. The first station may include one of, or both, a measurement station or step-hole creating station. The first station then processes the piece part. The processing includes at least one of measuring a raw part or a step-hole and drilling a step-hole. After the processing of the first station is complete, the part holding and positioning system (still containing the piece part) is moved to a second processing station (e.g. a flow-hole creating station), such as station 130. The second processing station then processes the piece-part. For example, the second processing station may use a laser to drill a through hole in the piece part. The through hole may be drilled with a diameter that is smaller than the diameter of the step-hole if a step-hole is present. Once the second processing station completes its processing of the piece-part, the completed piece-part may be unloaded from the part holding and positioning system back to the in-flow/out-flow robot. Finally the completed piece-part is unloaded from the in-flow/out-flow system.

In another example, the above-disclosed steps may be performed by multiple part holding and positioning systems operating in concert, interacting with the multiple processing stations as needed. For example, a system may feature multiple first processing stations and second processing stations. When a piece-part is input to the system, it may be moved to one of the multiple first stations to have the step-hole measured or drilled. When the first station completes, the piece-part may be moved to one of the multiple second processing stations. In this embodiment, each first processing station may be used with any of the multiple second processing stations. However, in other embodiments, each first processing station may have a specific second processing station to which piece-parts that have been processed by the first processing station are moved.

An example sequence chart is shown in the figure below. In the sequence chart, two piece-parts are being processed simultaneously.

|        |                      | Station #1 (e.g. Measurement) | Station #2 (e.g. Laser Drilling) | Station #3 (e.g. Measurement) | Station #4 (e.g. In-Flow/Out-Flow) |
|--------|----------------------|---|---|---|---|
| Step 1 | Positioning System #A | X | | | |
|        | Positioning System #B | | X | | |
|        | Robot                | X | | | |
|        | Description          | Load/Unload #A | Drill #B | | |
| Step 2 | Positioning System #A | X | | | |
|        | Positioning System #B | | X | | |
|        | Robot                | | | | X |
|        | Description          | Measure #A | Drill #B | | Load/Unload |
| Step 3 | Positioning System #A | | X | | |
|        | Positioning System #B | | | X | |
|        | Robot                | | | X | |
|        | Description          | | Drill #A | Load/Unload #B | |
| Step 4 | Positioning System #A | | X | | |
|        | Positioning System #B | | | X | |
|        | Robot                | | | | X |
|        | Description          | | Drill #A | Measure #B | Load/Unload |
| Step 1 | Positioning System #A | X | | | |
|        | Positioning System #B | | X | | |
|        | Robot                | X | | | |
|        | Description          | Load/Unload #A | Drill #B | | |

The present disclosure may include a combined system that maximizes the utilization of a laser system by providing a load-leveled ratio of measurement or step-hole stations to flow-hole stations. The system design may, in the case of incoming material without step-holes, combine the production of both step-holes and flow-holes. In some embodiments, the disclosed system design that can accommodate incoming material either with or without the step-holes in place by only exchanging the step-hole measuring sensors with step-hole drilling spindles. Embodiments also include the system handling both material loading and unloading and (in the case of a step-hole creating system) tool changing for the step-hole stations.

Figure 4:
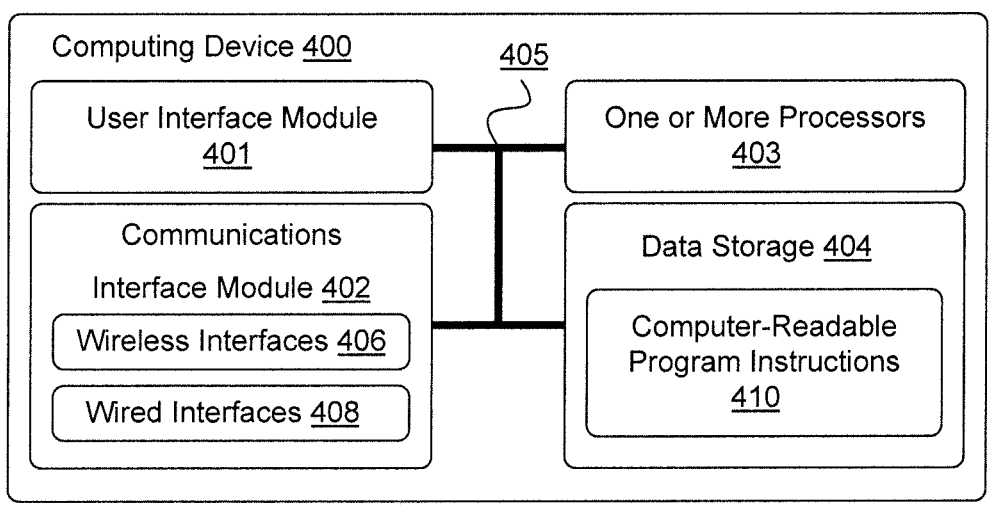
FIG. 4 is an example computing device for use with the disclosed apparatuses.

Additionally, FIG. 4 is a block diagram of a computing device 400 in accordance with an example embodiment. For example, computing device 400 may include a user interface configured to provide input and/or to control the disclosed system. The computing device 400 can include a user interface module 401, a communication interface module 402, one or more processors 403, and data storage 404, all of which can be linked together via a system bus, network, or other connection mechanism 405. Additionally, the computer readable instructions 410 in the data storage 404 may be executed by the one or more processors 403 to cause the system to perform functions disclosed herein.

For example, a computing device may be configured with instructions to control machining hardware to perform functions as described herein. For example, instructions may include instructions to control the robotic arm to take the material and transport it to one of the part holding and positioning systems. Once the material is loaded into the part holding and positioning system the instructions may cause the system to move the piece-part to a first station. At the first station, the instructions include at least one of measuring a step-hole and drilling a step-hole. After the processing of the first station is complete, the instructions include moving the piece part to a second processing station. At the second processing station the instructions may cause a laser to drill a through hole in the piece part. Once the second processing station completes its processing of the piece-part, the instructions may cause the completed piece-part to be unloaded from the part holding and positioning system back to the in-flow/out-flow robot.

Figure 5:
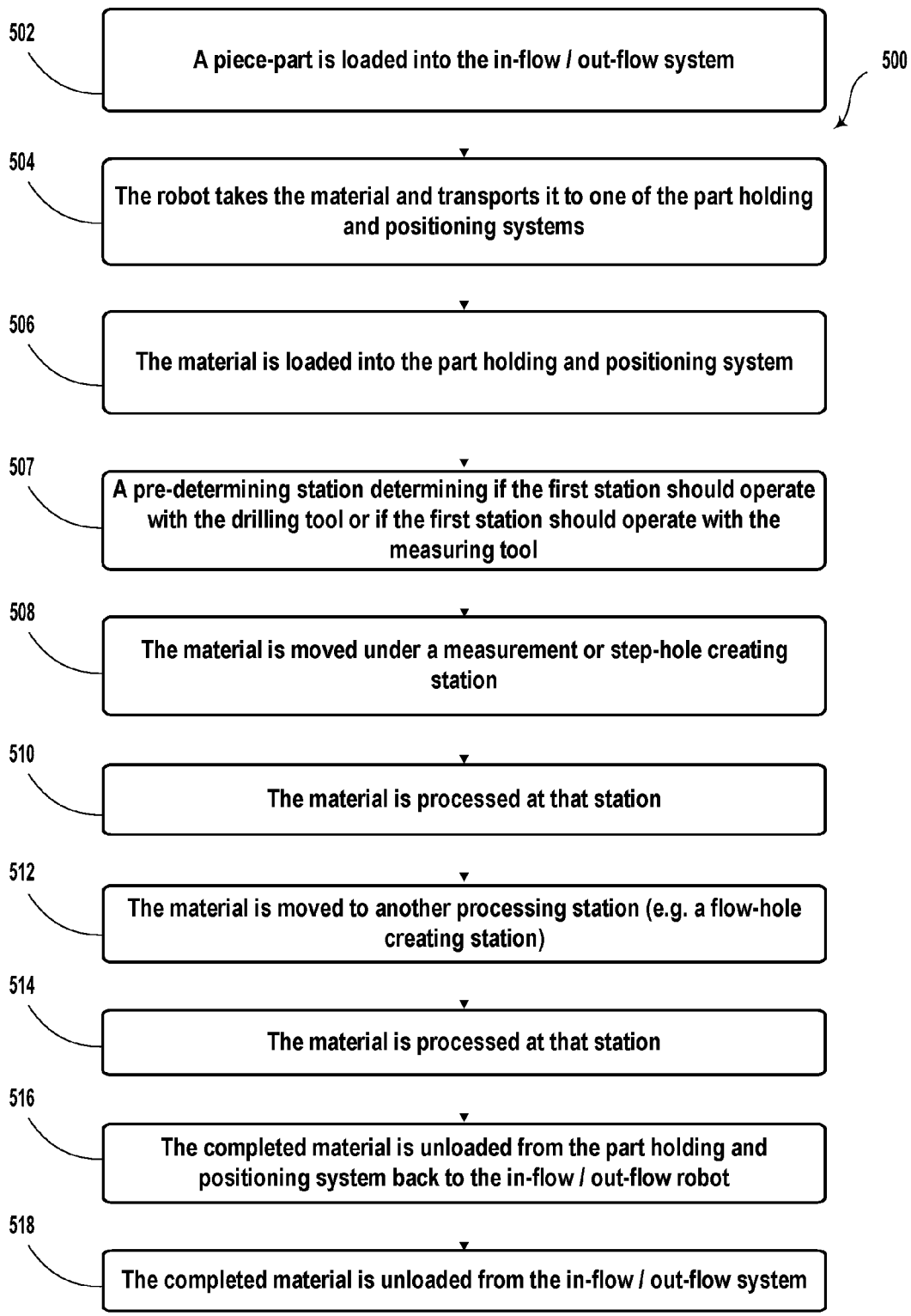
FIG. 5 shows one example mode of operating for processing an individual piece-part

FIG. 5 shows one example mode of operating for processing an individual piece-part 500. The method is as follows:

a. A piece-part is loaded into the in-flow/out-flow system 502;
b. The robot takes the material and transports it to one of the part holding and positioning systems 504;
c. The material is loaded into the part holding and positioning system 506;
d. A pre-determining station determining if the first station should operate with the drilling tool or if the first station should operate with the measuring tool 507;
e. The material is moved under a measurement or step-hole creating station 508;
f. The material is processed at that station 510;
g. The material is moved to another processing station (e.g. a flow-hole creating station) 512;
h. The material is processed at that station 514;
i. The completed material is unloaded from the part holding and positioning system back to the in-flow/out-flow robot 516;
j. The completed material is unloaded from the in-flow/out-flow system 518.

It will be readily understood that the aspects of the present disclosure, as generally described herein, and illustrated in the figures, can be arranged, substituted, combined, separated, and designed in a wide variety of different configurations, all of which are explicitly contemplated herein. While various aspects and embodiments have been disclosed herein, other aspects and embodiments will be apparent to those skilled in the art.

Example methods and systems are described above. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features. Reference is made herein to the accompanying figures, which form a part thereof. In the figures, similar symbols typically identify similar components, unless context dictates otherwise. Other embodiments may be utilized, and other changes may be made, without departing from the spirit or scope of the subject matter presented herein. The various aspects and embodiments disclosed herein are for purposes of illustration and are not intended to be limiting, with the true scope and spirit being indicated by the following claims.

We claim:

1. A system for drilling small holes, the system comprising:
a first station configured with a measuring unit configured to measure a part and a drilling unit configured to drill a hole having a first width;
a second station, wherein the second station is configured with a second drilling unit; and
a computer system configured to operate the first station and the second station, wherein the controlling comprises:
causing the first station to perform at least one of (i) measuring the part surface and (ii) drilling the hole; and
causing the second station to create the through hole;
a pre-determining station, wherein the pre-determining station is configured to determine if the first station should operate with the drilling tool or if the first station should operate with the measuring tool.

2. The system of claim 1, further comprising:
at least one part holding and positioning system configured to:
receive a part for machining;
provide the part to the first station;
provide the part to the second station; and
release the part after machining.

3. The system of claim 2, wherein the part holding and positioning system is further configured to provide the part to at least one other station after the second station and before releasing the part.

4. The system of claim 2, wherein the one or more part holding and positioning systems are configured such that each can interact with more than one of the processing stations.

5. The system of claim 2, further comprising at least two part holding and positioning systems wherein the at least two part holding and positioning systems are co-linear and have overlapping travel.

6. The system of claim 1, wherein each station is configured to operate independently of each other station.

7. The system of claim 2, further comprising at least two part holding and positioning systems, wherein the at least two part holding and positioning systems are configured to interact with at least one common processing station.

8. The system of claim 2, further comprising at least two part holding and positioning systems, wherein the at least two part holding and positioning systems are configured to operate independently of each other.

9. The system of claim 1, wherein drilling the first hole comprises a rotary drilling process.

10. The system of claim 1, wherein creating the through hole comprises a laser drilling process.

11. The system of claim 1, wherein the first station comprises both a drilling tool and a measuring tool.

12. A method for drilling, comprising:
determining if a first station should operate with the drilling tool or if the first station should operate with the measuring tool;
performing one of (i) measuring a depth of a pre-existing feature via a depth-measurement tool and (ii) drilling a step-hole via a drilling tool; and
drilling a through-hole via a laser drilling tool.

13. A method for drilling, comprising:
determining if a first station should operate with the drilling tool or if the first station should operate with the measuring tool;
measuring a depth of a step-hole via a depth-measurement tool; and
drilling a through-hole via a laser drilling tool, wherein the step-hole and the through-hole are concentric within a concentricity tolerance.

14. The method of claim 13, wherein the step-hole has a first diameter and the through-hole has a second diameter.

15. The method of claim 13, wherein the drilling the step-hole via the drilling tool comprises a rotary-based drilling.

16. The method of claim 13, wherein the step-hole and the through-hole are concentric, wherein a concentricity of the step-hole and the through-hole is within a concentricity tolerance.

17. An article of manufacture including a non-transitory computer-readable medium, having stored thereon program instructions that, if executed by a computing device, cause the computing device to perform operations comprising:
- determining if a first station should operate with the drilling tool or if the first station should operate with the measuring tool;
- performing one of (i) measuring a depth of a pre-existing step-hole via a depth-measurement tool and (ii) drilling a step-hole via a drilling tool; and
- drilling a through-hole via a laser drilling tool, wherein the step-hole and the through-hole are concentric and wherein a concentricity of the step-hole and the through-hole is within a concentricity tolerance.

18. The article of manufacture of claim 17, wherein the step-hole has a first diameter and the through hole has a second diameter.

19. The article of manufacture of claim 17, wherein the drilling the step-hole via the drilling tool comprises a rotary-based drilling.

20. The article of manufacture of claim 17, wherein the step-hole and the through-hole are concentric, wherein a concentricity of the step-hole and the through-hole is within a concentricity tolerance.

\* \* \* \* \*